(12) United States Patent  
Lagenfeld

(10) Patent No.: US 7,086,984 B1  
(45) Date of Patent: Aug. 8, 2006

(54) DIFFERENTIAL LOCK MECHANISM

(75) Inventor: Thomas J. Lagenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/887,981

(22) Filed: Jul. 9, 2004

Related U.S. Application Data

(63) Continuation of application No. 10/219,912, filed on Aug. 15, 2002, now Pat. No. 6,780,137.

(60) Provisional application No. 60/398,664, filed on Jul. 26, 2002.

(51) Int. Cl.  
*F16H 48/20* (2006.01)

(52) U.S. Cl. .................................... 475/231

(58) Field of Classification Search ................ 475/231  
See application file for complete search history.

(56) References Cited

U.S. PATENT DOCUMENTS

| | | |
|---|---|---|
| 1,446,545 A | 2/1923 | Brush et al. |
| 1,691,230 A | 11/1928 | Dennison |
| 1,983,841 A | 12/1934 | Drexler |
| 2,209,966 A | 8/1940 | Goeller |
| 2,566,601 A | 9/1951 | Cousins |
| 2,771,791 A | 11/1956 | Bachman |
| 2,774,253 A | 12/1956 | Minard et al. |
| 2,785,369 A | 3/1957 | Ligh |
| 2,985,035 A | 5/1961 | Toth |
| 3,029,661 A | 4/1962 | Schmitter |
| 3,090,253 A | 5/1963 | Linsley et al. |
| 3,264,900 A | 8/1966 | Hartupee |
| 3,528,323 A | 9/1970 | Kamlukin |
| 3,811,342 A | 5/1974 | Barthel |
| 3,871,249 A | 3/1975 | Jeffers |
| 3,915,032 A | 10/1975 | Ottemann |
| 3,916,728 A | 11/1975 | Behar et al. |
| 4,050,534 A | 9/1977 | Nelson et al. |
| 4,077,279 A | 3/1978 | Goscenski, Jr. |
| 4,227,427 A | 10/1980 | Dick |
| 4,238,013 A | 12/1980 | Goscenski, Jr. |
| 4,244,241 A | 1/1981 | Treadwell |
| 4,280,375 A | 7/1981 | Goscenski, Jr. |
| 4,290,321 A | 9/1981 | Wilson |
| 4,294,218 A | 10/1981 | King et al. |
| 4,389,909 A | 6/1983 | Goscenski, Jr. |
| 4,480,501 A | 11/1984 | von Xaler |
| 4,524,856 A | 6/1985 | Renaud |
| 4,696,164 A | 9/1987 | Giere |
| 4,759,232 A * | 7/1988 | Roberts ................ 475/86 |
| 4,781,259 A | 11/1988 | Yamaoka et al. |
| 4,834,319 A | 5/1989 | Ewy et al. |
| 4,838,118 A | 6/1989 | Binkley |

(Continued)

FOREIGN PATENT DOCUMENTS

JP 63-247122 * 10/1988 ................ 475/231

(Continued)

*Primary Examiner*—Ha Ho  
(74) *Attorney, Agent, or Firm*—Neal, Gerber & Eisenberg LLP

(57) ABSTRACT

A differential lock mechanism for use in a vehicle and having a cam mechanism that may be actuated by the vehicle user. The cam mechanism transfers rotational movement to linear movement along the axis of the vehicle axles to move an engagement mechanism into or out of engagement with an axle bevel gear. The engagement mechanism is also engaged to and rotates with a differential carrier, and thus when it is in the engaged position, it locks the vehicle axles to rotate with the differential carrier.

17 Claims, 21 Drawing Sheets

U.S. PATENT DOCUMENTS

| | | |
|---|---|---|
| 4,862,767 A | 9/1989 | Hauser |
| 4,867,008 A | 9/1989 | Yamaoka et al. |
| 4,907,470 A | 3/1990 | Kasemeier et al. |
| 4,930,367 A | 6/1990 | Nagasawa |
| 4,938,738 A | 7/1990 | Fuelberth et al. |
| 4,959,043 A | 9/1990 | Klotz et al. |
| 4,973,296 A | 11/1990 | Shibahata |
| 4,979,582 A | 12/1990 | Forster |
| 5,007,886 A | 4/1991 | Holmquist et al. |
| 5,019,021 A | 5/1991 | Janson |
| 5,055,095 A | 10/1991 | Osenbaugh et al. |
| 5,092,825 A | 3/1992 | Goscenski, Jr. et al. |
| 5,098,360 A | 3/1992 | Hirota |
| 5,156,576 A | 10/1992 | Johnson |
| 5,158,507 A | 10/1992 | Guimbretiere |
| 5,171,192 A * | 12/1992 | Schlosser et al. ............ 475/237 |
| 5,183,446 A | 2/1993 | Hughes |
| 5,201,692 A | 4/1993 | Johnson et al. |
| 5,215,506 A | 6/1993 | Hara |
| 5,284,065 A | 2/1994 | Loeffler et al. |
| 5,314,387 A | 5/1994 | Hauser et al. |
| 5,317,936 A | 6/1994 | Shiba et al. |
| 5,323,890 A | 6/1994 | Okada |
| 5,330,394 A | 7/1994 | Hauser et al. |
| 5,339,708 A | 8/1994 | Nakamura |
| 5,342,255 A | 8/1994 | Slesinski et al. |
| 5,386,742 A | 2/1995 | Irikura et al. |
| 5,404,772 A | 4/1995 | Jester |
| 5,484,347 A | 1/1996 | Holmquist |
| 5,528,958 A | 6/1996 | Hauser |
| 5,549,523 A | 8/1996 | Doucet |
| 5,558,592 A | 9/1996 | Honlinger et al. |
| 5,584,777 A | 12/1996 | Sander et al. |
| 5,591,098 A * | 1/1997 | Jones et al. .................. 475/231 |
| 5,613,409 A | 3/1997 | Hauser |
| 5,647,249 A | 7/1997 | Okada et al. |
| 5,647,814 A | 7/1997 | Krisher |
| 5,664,465 A | 9/1997 | Okada et al. |
| 5,782,717 A | 7/1998 | Smothers et al. |
| 5,807,200 A | 9/1998 | Hauser |
| 5,816,971 A | 10/1998 | Zentmyer et al. |
| 5,863,271 A | 1/1999 | Schreier et al. |
| 5,897,452 A | 4/1999 | Schreier et al. |
| 5,899,826 A | 5/1999 | Schreier et al. |
| 5,984,822 A | 11/1999 | Schreier et al. |
| 6,007,449 A | 12/1999 | Okada et al. |
| 6,015,362 A | 1/2000 | Irikura et al. |
| 6,024,665 A | 2/2000 | Hauser |
| 6,027,422 A | 2/2000 | Yamazaki |
| 6,027,424 A | 2/2000 | Reynolds |
| 6,056,663 A | 5/2000 | Fett |
| 6,083,134 A * | 7/2000 | Godlew ...................... 475/231 |
| 6,432,020 B1 * | 8/2002 | Rivera et al. ................ 475/231 |
| 6,450,915 B1 * | 9/2002 | Kazaoka et al. ............. 475/231 |
| 6,520,885 B1 | 2/2003 | Gassmann et al. |
| 6,551,209 B1 * | 4/2003 | Cheadle et al. ............. 475/150 |

FOREIGN PATENT DOCUMENTS

| | | | |
|---|---|---|---|
| JP | 64-49740 | * 2/1989 | ................ 475/231 |

* cited by examiner

DIFFERENTIAL LOCK MECHANISM

CROSS REFERENCE TO RELATED APPLICATIONS

This application is a continuation of U.S. patent application Ser. No. 10/219,912 filed on Aug. 15, 2002 now U.S. Pat. No. 6,780,137, which claims the benefit of U.S. Provisional Patent Application Ser. No. 60/398,664, filed Jul. 26, 2002. These applications are incorporated herein by reference in their entirety.

BACKGROUND OF THE INVENTION

This invention relates to differentials used in transmissions.

SUMMARY OF THE INVENTION

This invention is directed to a locking mechanism used in vehicle differentials. The invention is described in connection with an integrated hydrostatic transaxle, i.e., a transaxle incorporating both a hydrostatic transmission having a hydraulic pump and motor as well as output gearing, and a differential. The specific transaxle depicted is very similar to that shown in U.S. Pat. Nos. 5,613,409 and 5,782,717, the terms of which are incorporated herein by reference. But it will be understood by those of skill in the art that the differential mechanism disclosed herein is not limited to use with such an integrated hydrostatic transaxle. Rather, this invention could be used with non-hydrostatic transaxles, other types of hydrostatic transaxles, four wheel drive vehicles and the like.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
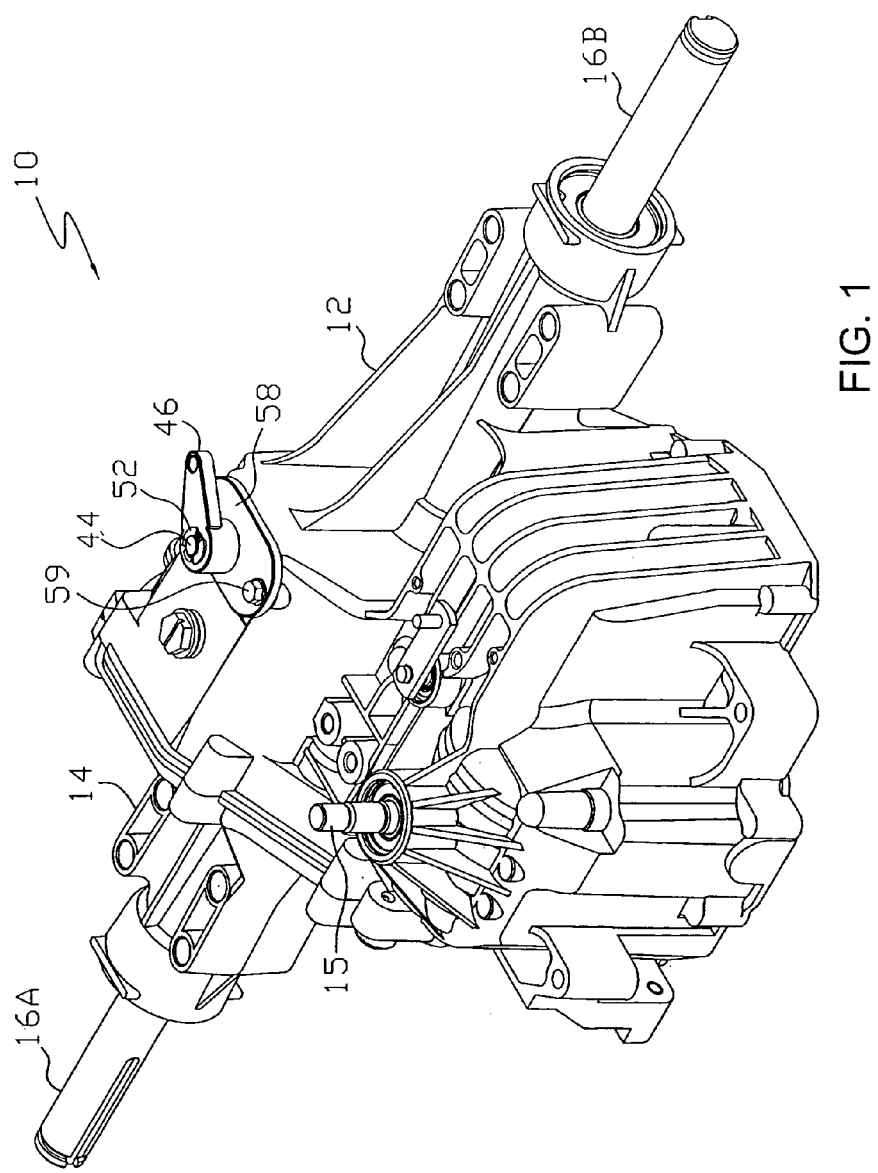
FIG. 1 is a perspective view of a transaxle incorporating the present invention.
Figure 2:
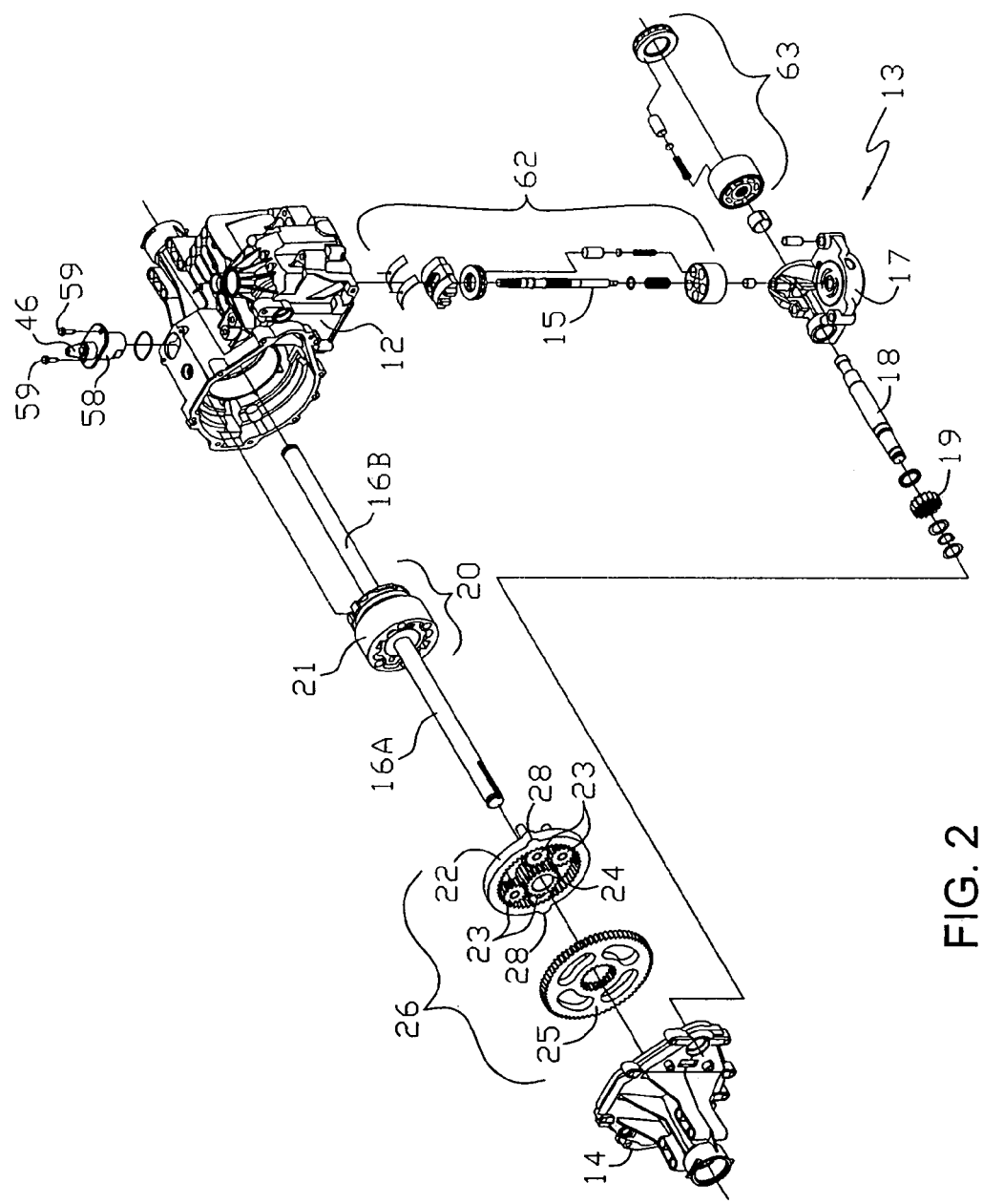
FIG. 2 shows an exploded view of a hydrostatic transaxle incorporating a first embodiment the present invention.

A first embodiment of this invention is depicted in FIGS. 1–14. FIGS. 1 and 2 show an integrated hydrostatic transaxle 10 having a main casing 12 and a side casing 14. An input shaft 15 is mounted in main casing 12 to drive the hydraulic pump 62 of the hydrostatic transmission 13 mounted inside transaxle casings 12 and 14. Pump 62 and motor 63, both of which are mounted on center section 17, are of the axial piston design. FIG. 2 does not show every feature of pump 62 and motor 63, as such elements are well known in the art. As noted above, this specific embodiment is shown for illustrative purposes only and the invention is not limited to this type of integrated hydrostatic transaxle or to hydrostatic transaxles as a general category. The hydrostatic transmission and its connection to the differential is disclosed in detail in U.S. Pat. No. 5,782,717, the terms of which are incorporated by reference.

Axles 16A and 16B are coaxially mounted in the housing and are connected by differential 20. Planetary reduction 26 is mounted on axle 16A and the components thereof are shown most clearly in the exploded view shown in FIG. 3. A sun gear 24 and four planet gears 23 are mounted inside ring gear 22. Planet gears 23 are each mounted on a separate planet pin 27 corresponding thereto. It should be noted that these planetary gear components are shown merely for completeness and are not required to use the invention disclosed herein. This invention could be used with a wide variety of different types of differentials.

The rotational output of the hydrostatic transmission 13 is transferred through a gear 19, mounted on hydraulic motor output shaft 18 or some other means to rotate spur gear 25. Spur gear 25 is engaged to sun gear 24, about which rotate a plurality of planet gears 23 mounted in ring gear 22. Planet gears 23 are each mounted on respective planet pins 27 which are engaged to planet carrier 21, which functions as a differential housing. While this embodiment depicts planet carrier 21 as having a multitude of functions, it will be understood that a differential housing would fall within the scope of this invention as long as it restrains the engagement mechanism and provides an interface with the cam mechanism, both of which are described herein, and it rotates with the differential input gear, which is spur gear 25 in this embodiment.

Ring gear 22 is mounted in a fixed manner inside axle housing 12, using notches or tabs 28 which mate with corresponding features in axle housing 12 to prevent rotation of ring gear from rotating with respect thereto.

Thrust washers are used as needed within this mechanism, as will be understood by one of skill in the art. As depicted, thrust washer 29A is mounted between planet gears 23 and pins 27 and the spur gear 25. A second thrust washer 29B is mounted to absorb thrust forces between sun gear 24 and an axle bushing (not shown). A third thrust washer 29C is mounted between bevel gear 31A and sun gear 24, while a similar thrust washer 29F is mounted between bevel gear 31B and another bushing (not shown). A fourth thrust washer 29D is mounted in housing 12 to absorb forces from planet carrier 21. Additional bushings or other mounting paraphernalia may be used as needed, and one of skill in the art could adjust these elements as necessary depending on size, intended load and the like.

Figure 3:
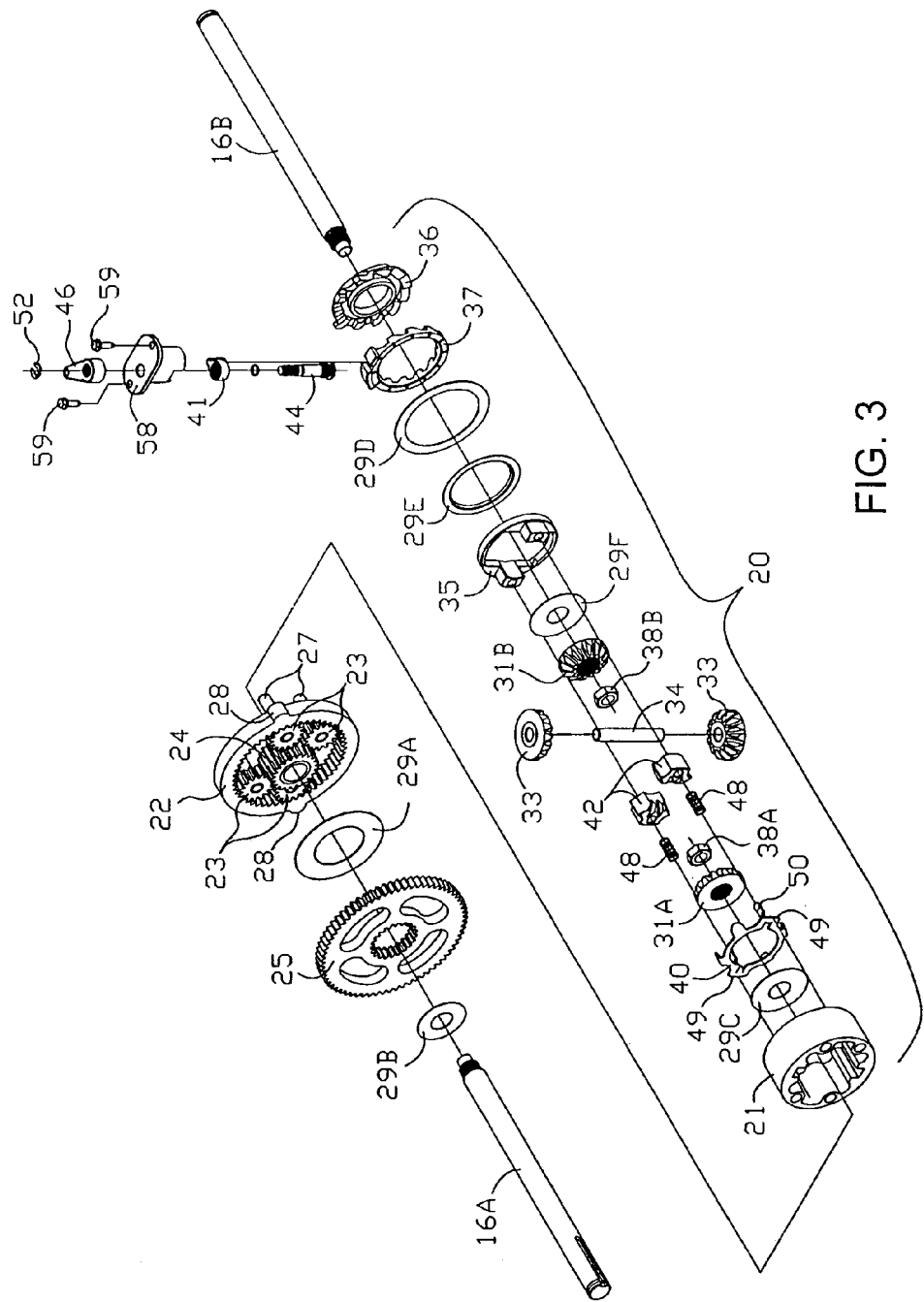
FIG. 3 is a further exploded view of the planetary reduction and the differential components of a first embodiment of the present invention.
Figure 4:
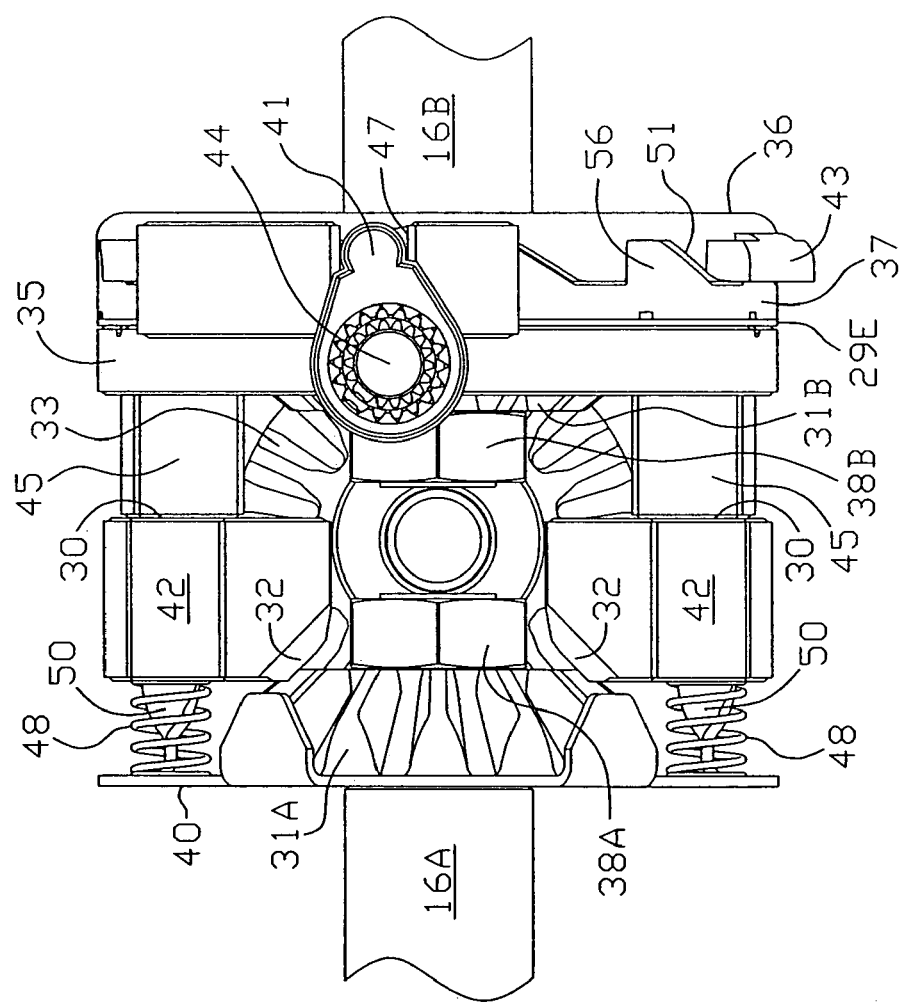
FIG. 4 is a top view of the differential mechanism of FIG. 3, with certain components removed for clarity, with the differential lock mechanism in the disengaged position.

The components of differential 20 are shown most clearly in the exploded view of FIG. 3 and in FIG. 4. A pair of axle bevel gears 31A and 31B are mounted on and drive the coaxial output axles 16A and 16B, respectively, and are secured thereto by nuts 38A and 38B. A pair of planet bevel gears 33 are mounted on cross shaft 34 and engage axle bevel gears 31A and 31B, which are mounted so that their respective gear teeth are facing inwards towards one another. Cross shaft 34 is mounted in and rotated by planet carrier 21.

The locking ability of this differential enables the user to selectively engage and disengage various elements to permit axle bevel gears 31A and 31B, and thus axles 16A and 16B, to rotate directly with planet carrier 21, eliminating any differentiating action.

This locking feature comprises a plurality of engagement devices 42 to act as the engagement or locking mechanism herein. These devices are often referred to as "gear dogs" or "dogs." It should be noted that only one such dog 42 is required for locking; more than one can be used depending on the life and strength of the unit required, and the invention is not limited to a specific number of such engagement elements. In the embodiment depicted, each dog 42 has a flat surface 30 on one side, and one or more gear teeth 32 on the opposite side thereof.

Figure 6:
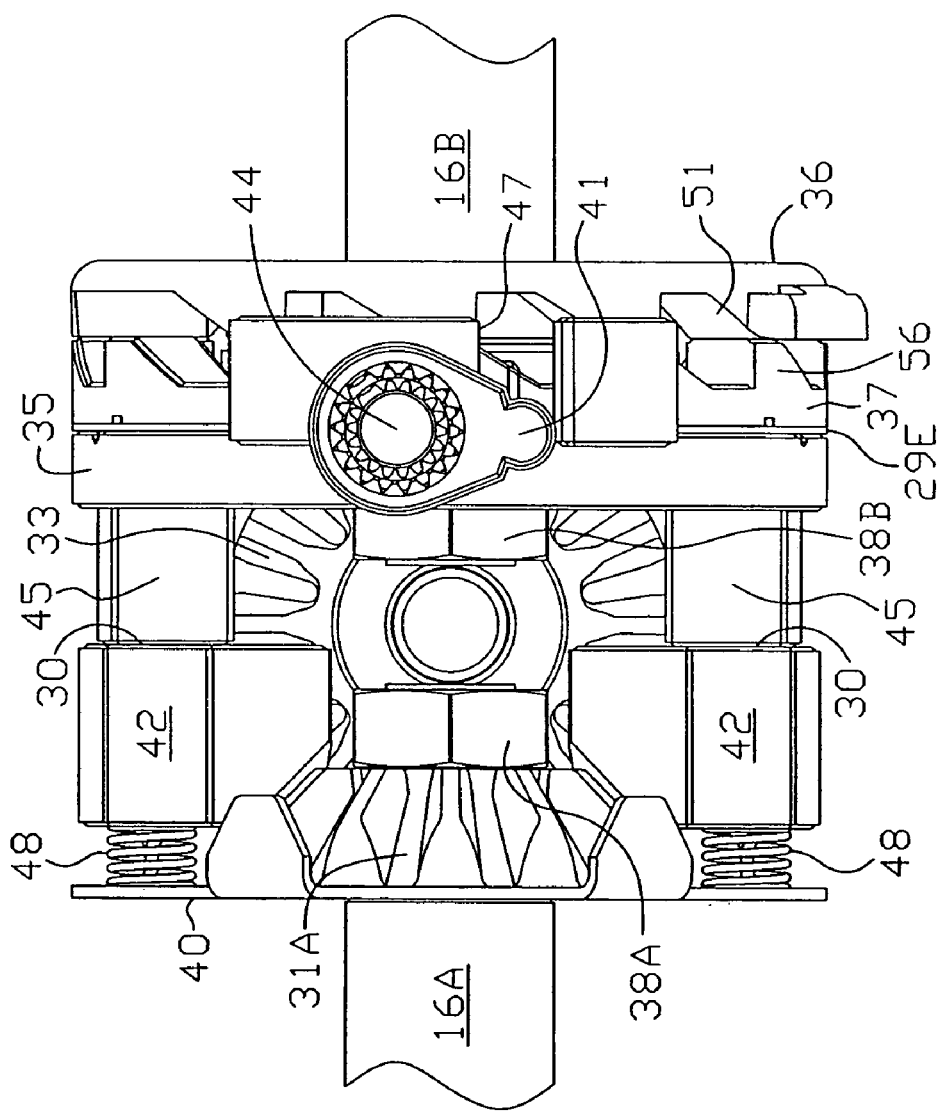
FIG. 6 is a top view of the differential lock mechanism of FIG. 3 in the engaged or actuated position, with certain elements removed for clarity.

In the disengaged position, such as is shown in FIG. 4, engagement dogs 42 are maintained in a position off bevel gear 31A by means of springs 48, which are preferably coil springs mounted on tines 50 of guide 40. In the engaged position, as shown in FIG. 6, teeth 32 of dogs 42 are pushed into and engage with bevel gear 31A. In the embodiment shown, guide 40 includes a plurality of tabs 49 integrally formed therewith to engage planet carrier 21, in order to reduce stress on tines 50; such engagement of guide 40 with planet carrier 21 is preferred but not required. Load plate 35 and engagement dogs 42 are engaged with and thus rotate with planet carrier 21. Thus, in the locked or engaged position, axle bevel gear 31A is locked with and rotate with planet carrier 21 through gear teeth 32 on dogs 42. This arrangement locks axle bevel gear 31A to planet carrier (or differential housing) 21, which then prevents rotation of planet bevel gears 33 about cross shaft 34, thus eliminating differentiating action.

Figure 5:
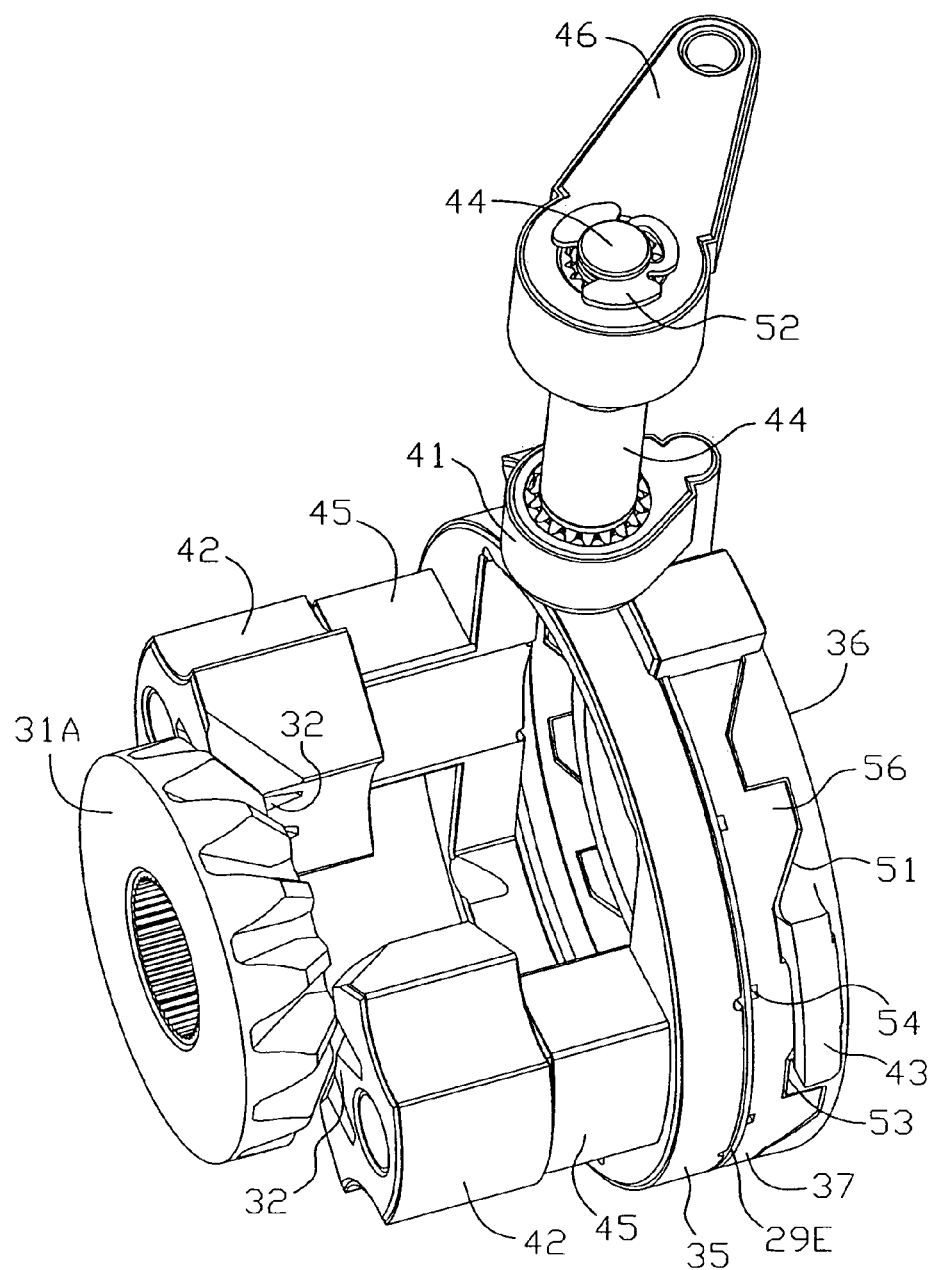
FIG. 5 is a detail perspective view of the cams and actuating mechanism shown in FIG. 4.
Figure 7:
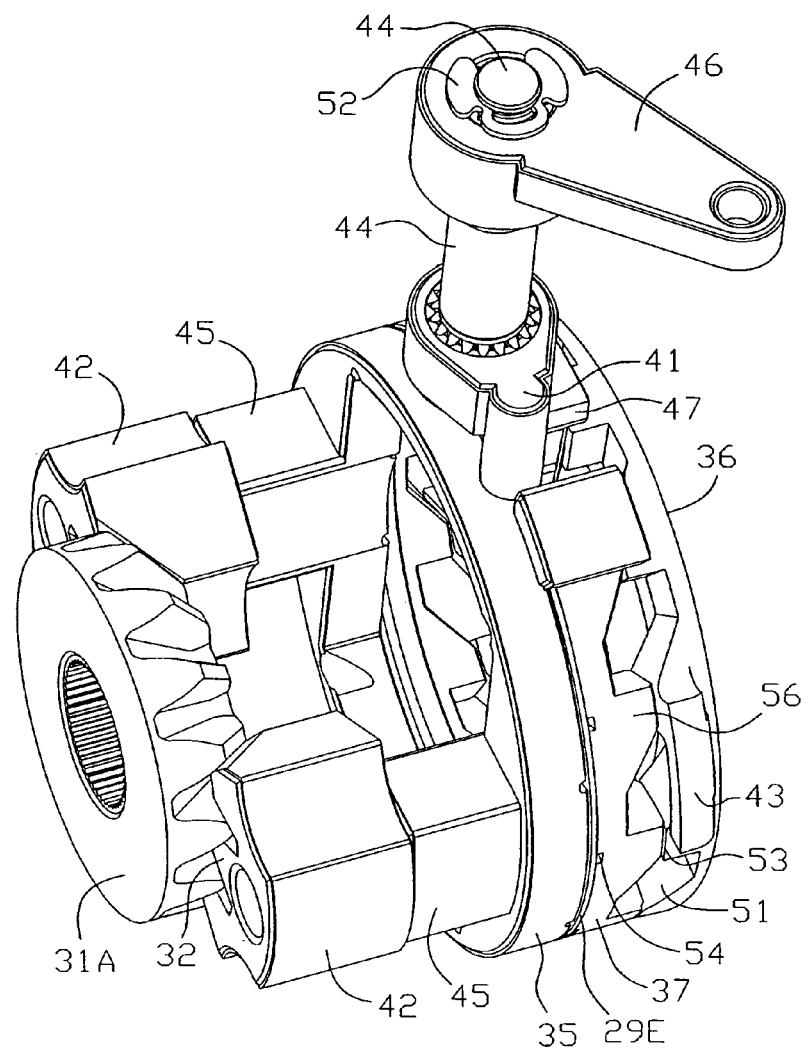
FIG. 7 is a detail perspective view of the cams and actuating mechanism of the mechanism shown in FIG. 6.
Figure 8:
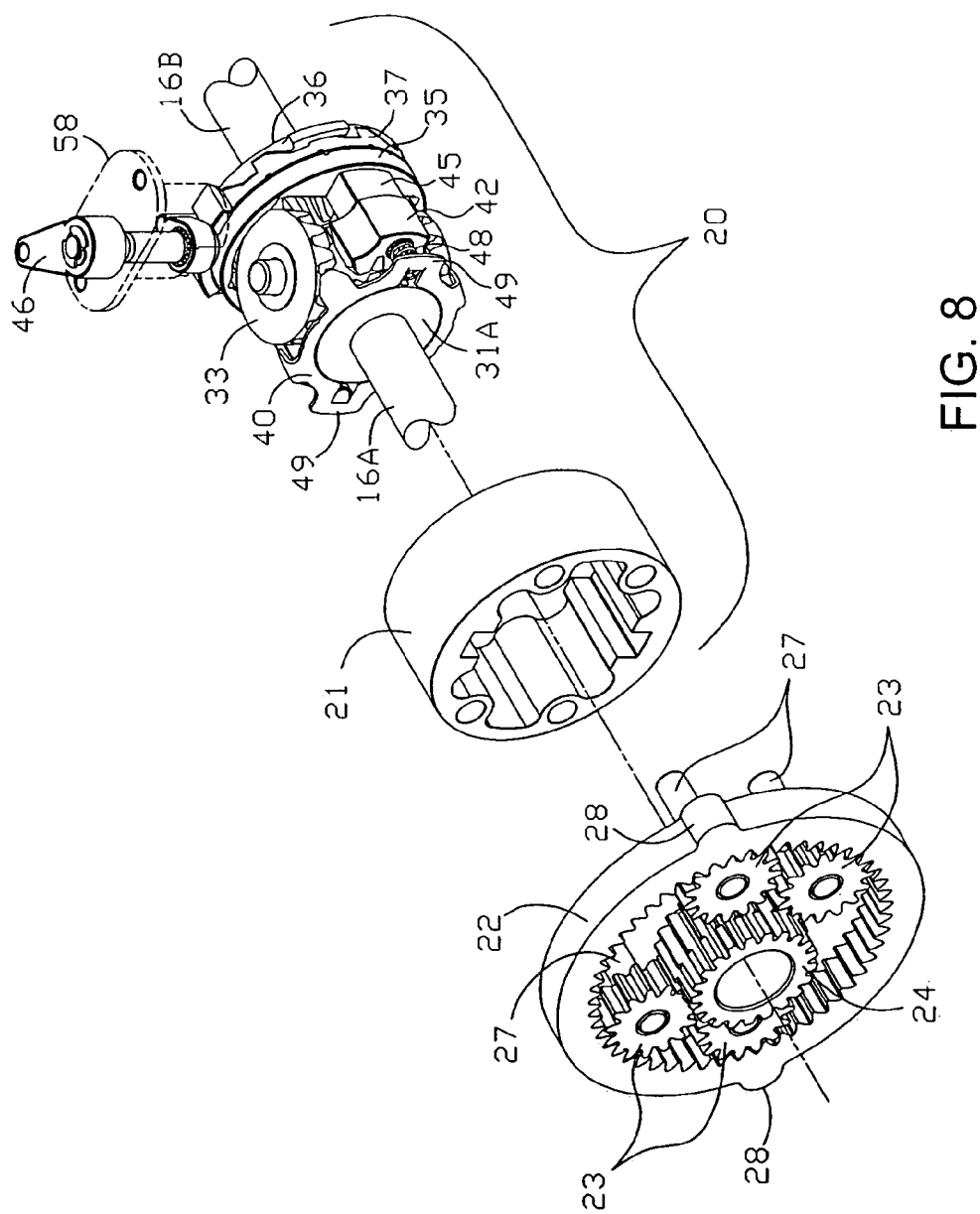
FIG. 8 is an exploded view of selected components of the differential in accordance with the first embodiment of the present invention.

The engagement of gear teeth 32 of dogs 42 with axle bevel gear 31 is accomplished by various cams and load plate 35. In FIGS. 4 and 6, one of the planet bevel gears 33, planet carrier 21 and actuator handle 46 have been removed for clarity. FIG. 5 shows these various cam mechanisms in the disengaged position and FIG. 7 shows these cams in the engaged position.

Figure 15:
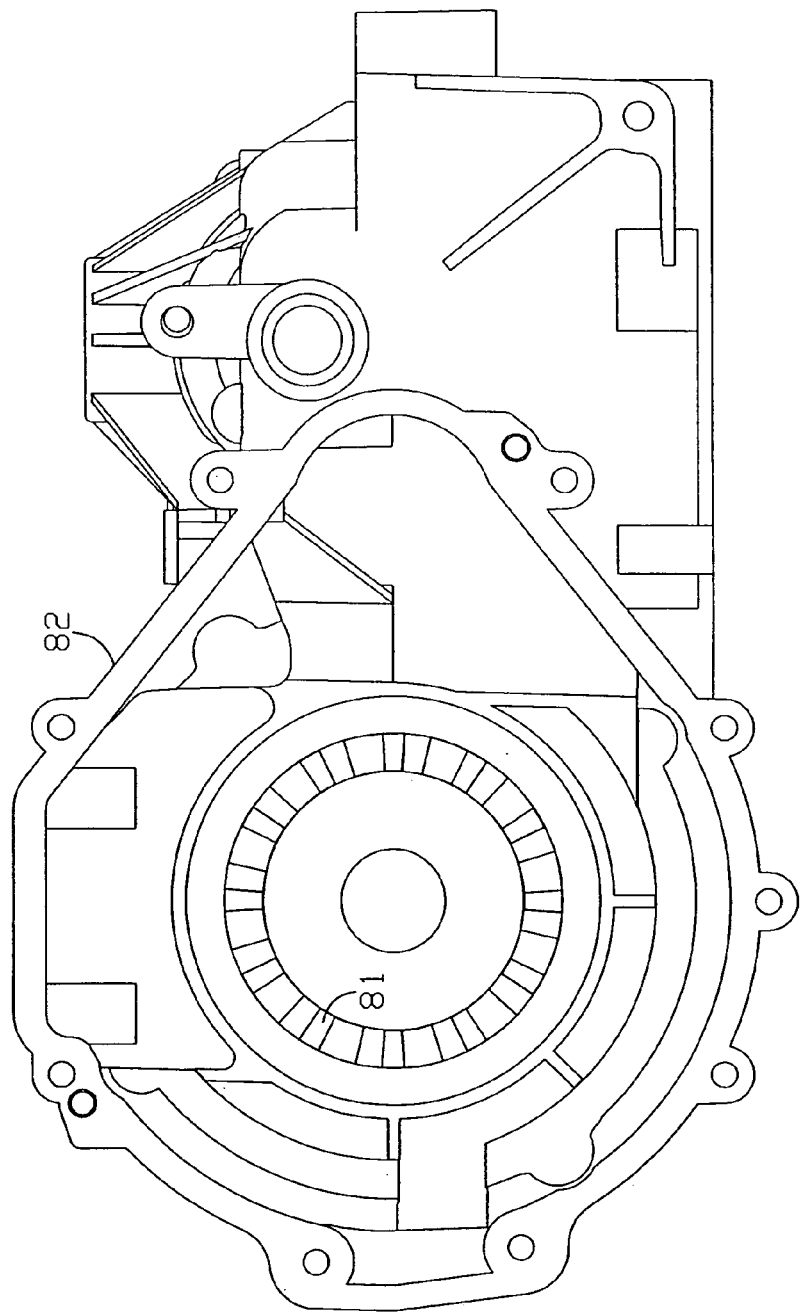
FIG. 15 is an end view of a second embodiment of the axle housing having the stationary cam mechanism integrally formed therewith.
Figure 16:
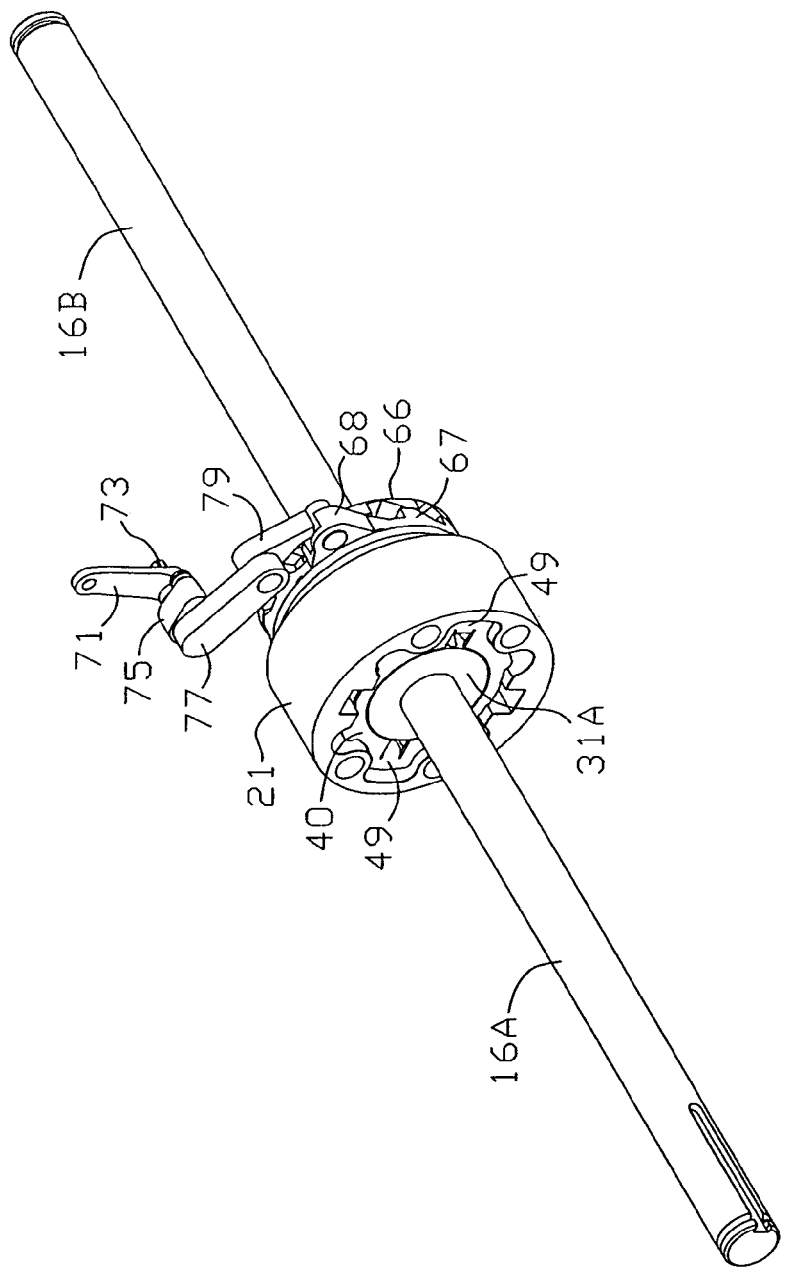
FIG. 16 is a perspective view of a third embodiment of this invention including an optional over-center linkage.
Figure 17:
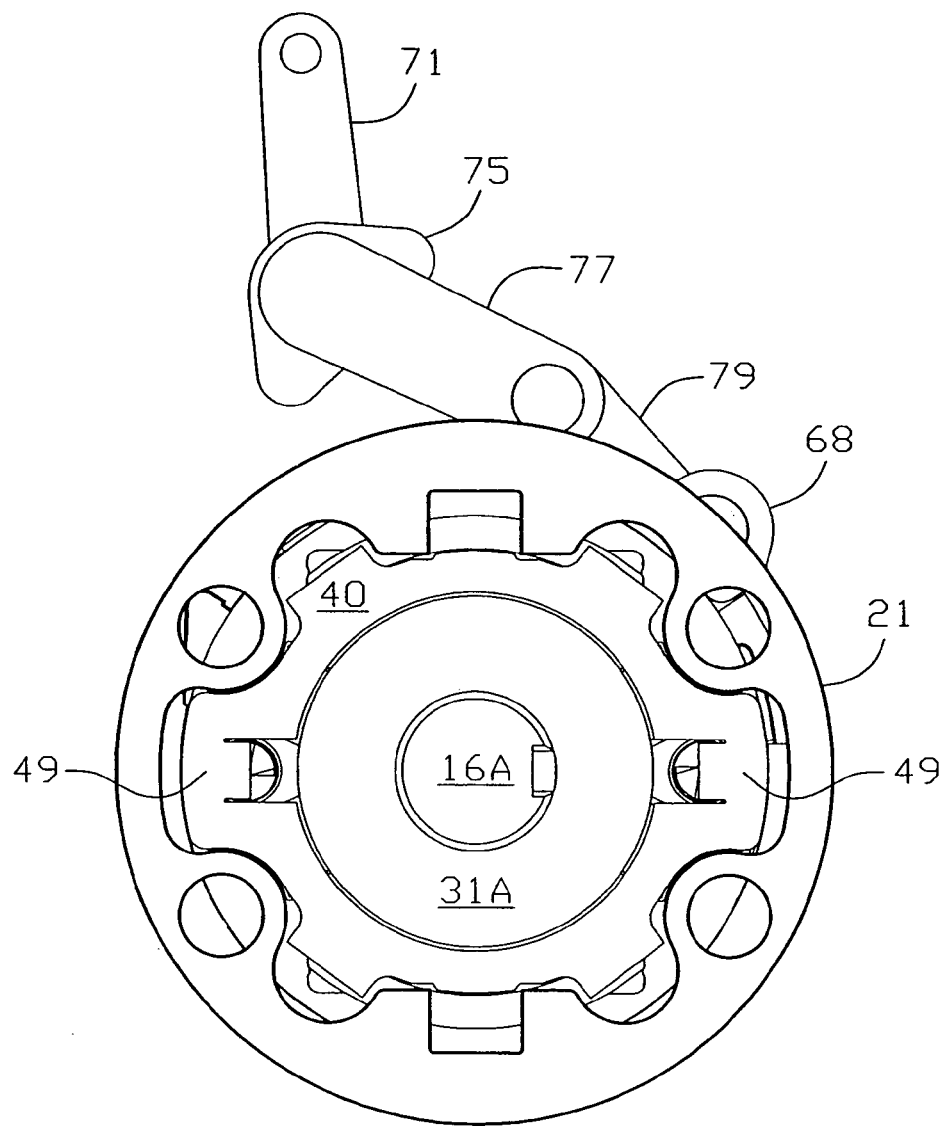
FIG. 17 is an end plan view of the mechanism shown in FIG. 16.
Figure 18:
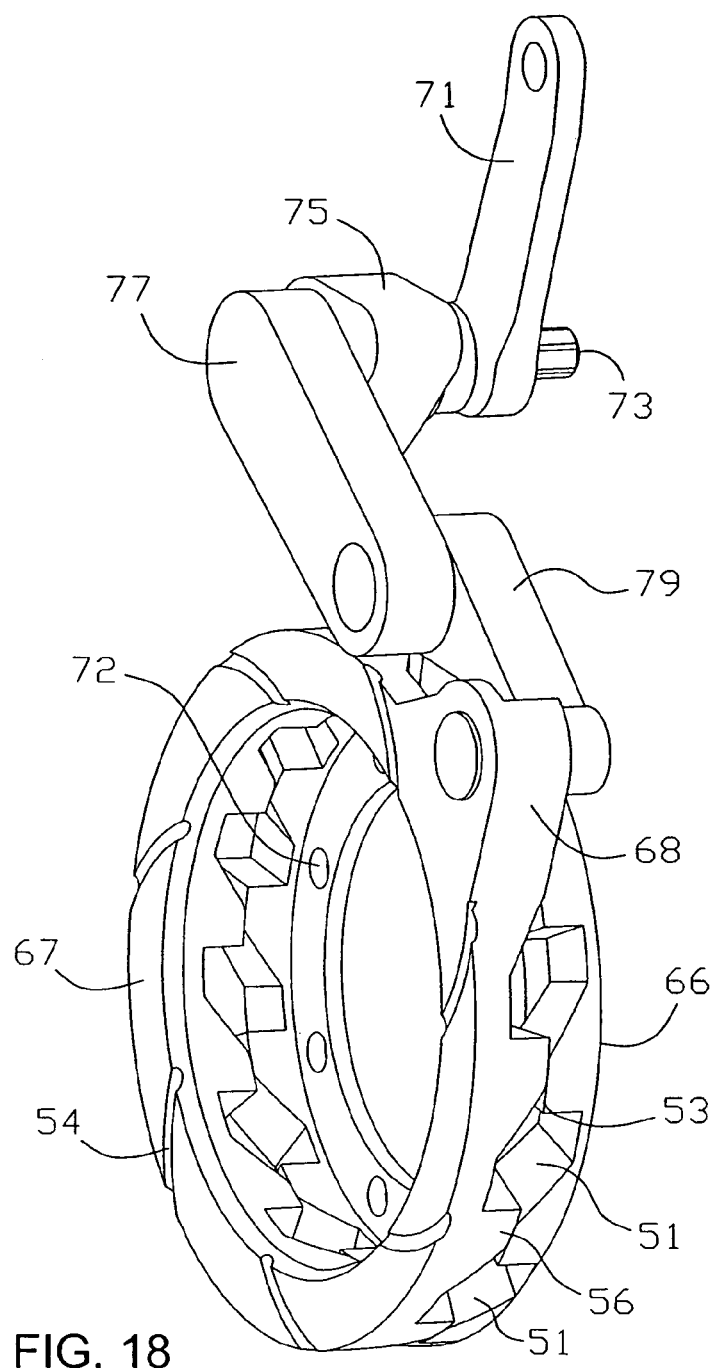
FIG. 18 is a detail perspective view of the cams and actuating mechanism of the embodiment shown in FIG. 16.
Figure 19:
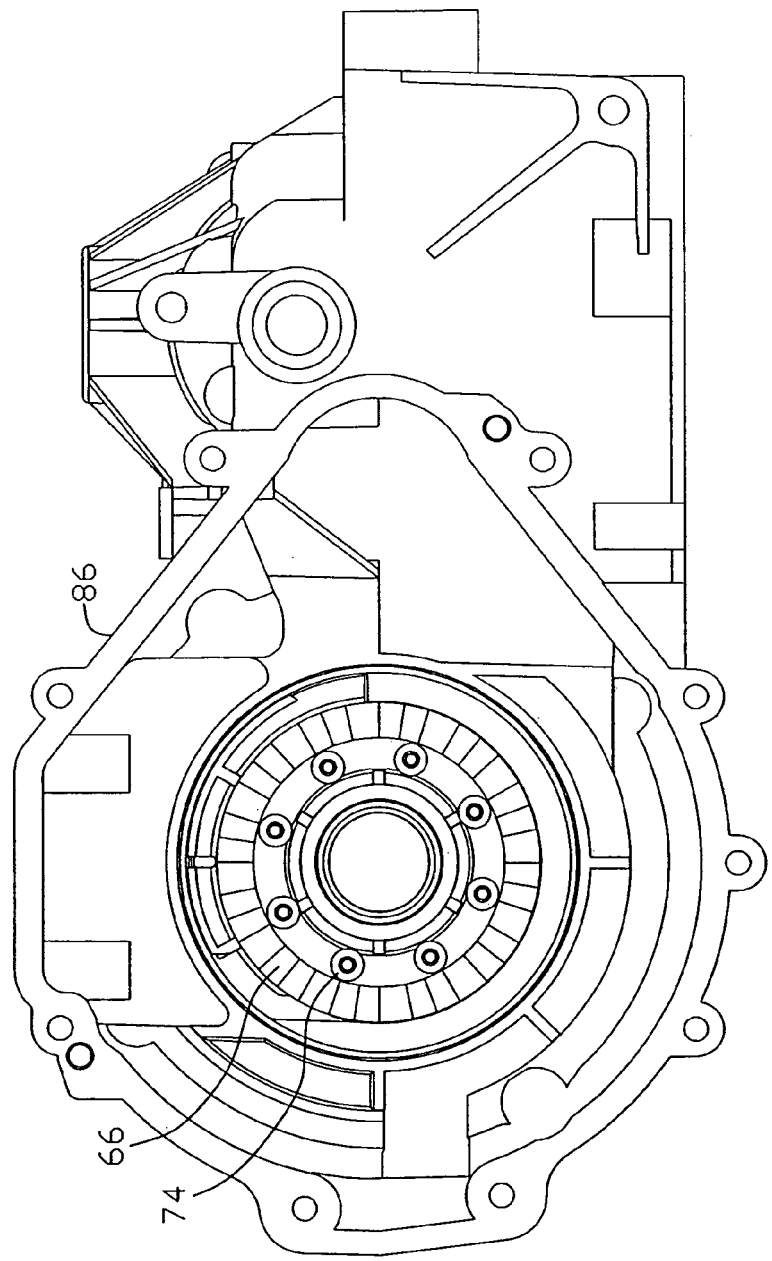
FIG. 19 is an end plan view of the stationary cam shown in FIG. 18 mounted in the axle housing.

Stationary cam 36 is mounted to transaxle housing 12 to prevent rotation of cam 36. In the embodiment shown in, e.g., FIGS. 3 and 12, this is accomplished by protrusions 43 that directly engage corresponding features on the inside of axle housing 12. In the alternative embodiment shown in FIGS. 16–19, stationary cam 66 has a plurality of screw openings 72. Cam 66 is secured to axle housing 86 through screws 74 or other fasteners secured to axle housing 86 through openings 72 in stationary cam 66; other means of securing cam 66 to the axle housing to prevent rotation could also be used. For example, as shown in FIG. 15, stationary cam teeth 81 could also be integrally formed with axle housing 82. For simplicity, the following discussion will form on stationary cam 36 as shown in, e.g., FIG. 12.

Figure 11:
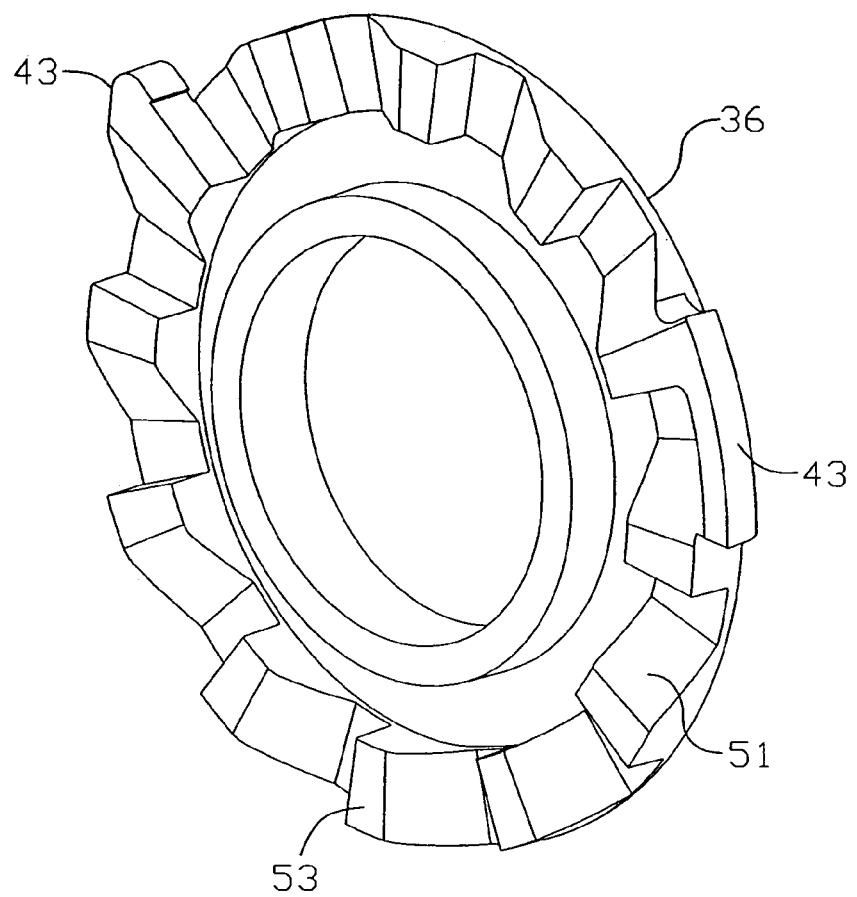
FIG. 11 is a perspective view of the stationary cam of the first embodiment of the present invention.
Figure 12:
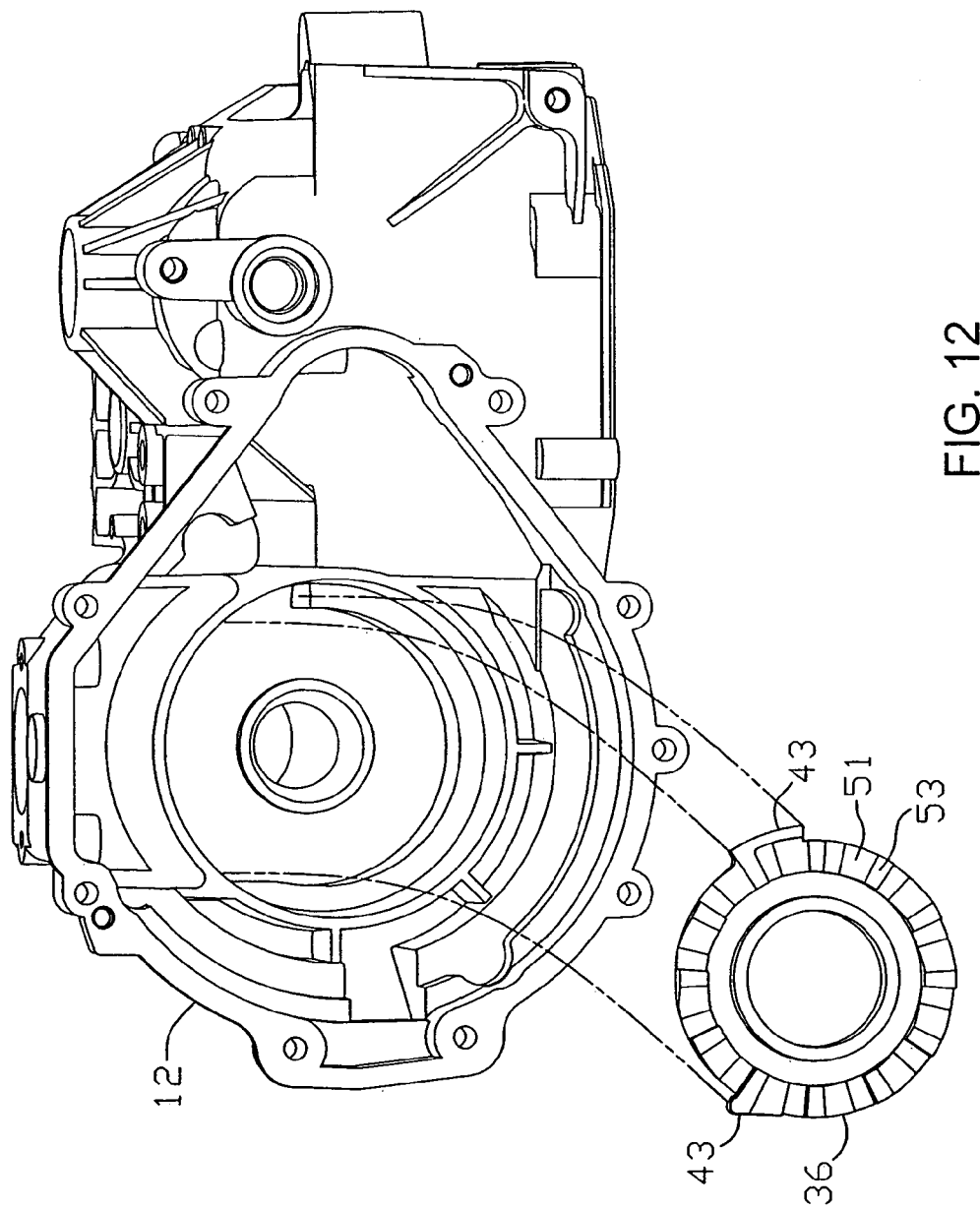
FIG. 12 is a partially exploded view showing the axle housing and stationary cam of the first embodiment of the present invention.
Figure 13:
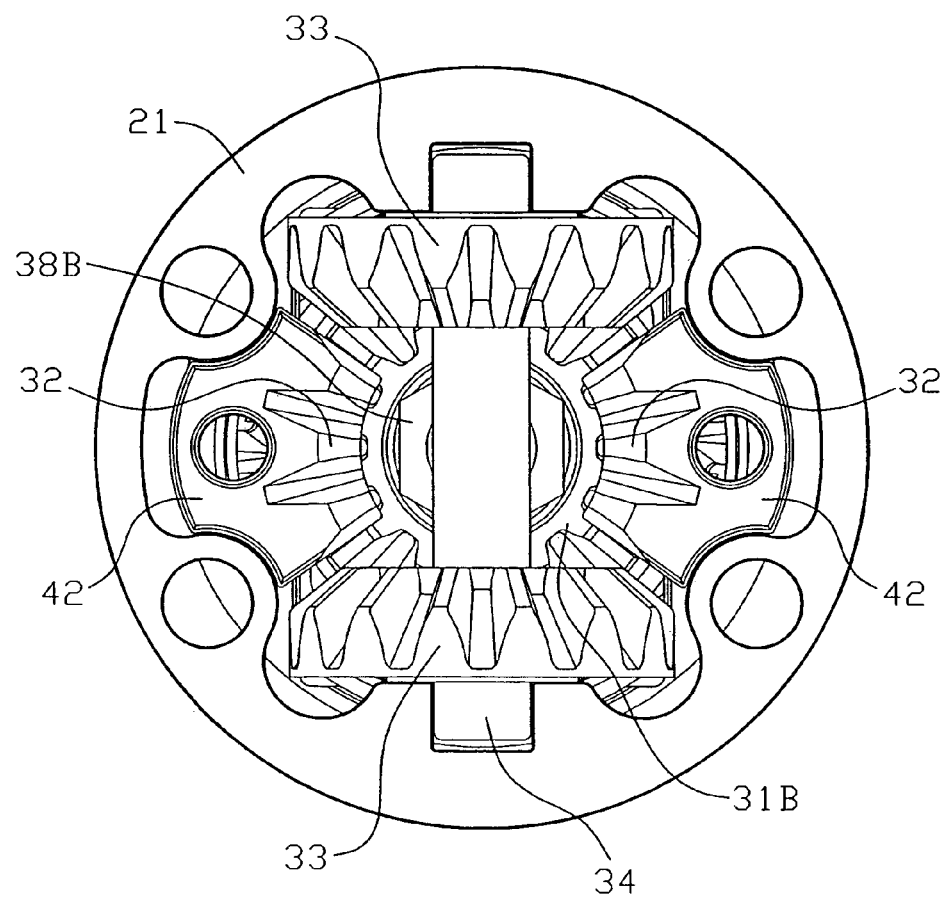
FIG. 13 is an end view of the first embodiment of the differential housing, and selected components mounted therein.

As shown most clearly in FIG. 11, stationary cam 36 includes a plurality of ramps 51 which would preferably be helical to reduce wear and loading; ramps 51 could also be flat or any other geometric configuration that would appropriately transfer the rotational cam movement to the necessary axial movement. This design would depend on the loads, total surface area and the size of the bevel gears, which would affect the distance that the engagement dogs 42 need to be translated.

Figure 9:
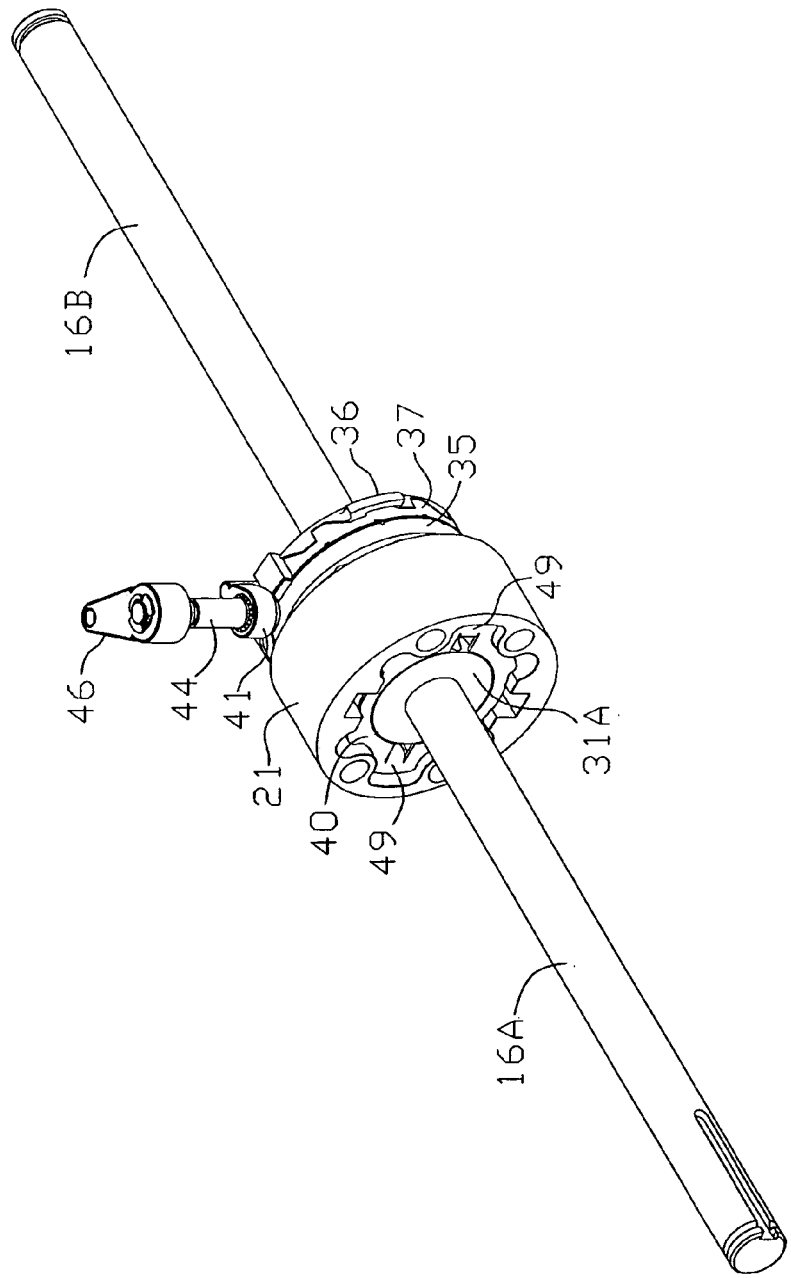
FIG. 9 is a perspective view of the differential housing and cam mechanism of the first embodiment of the present invention.
Figure 10:
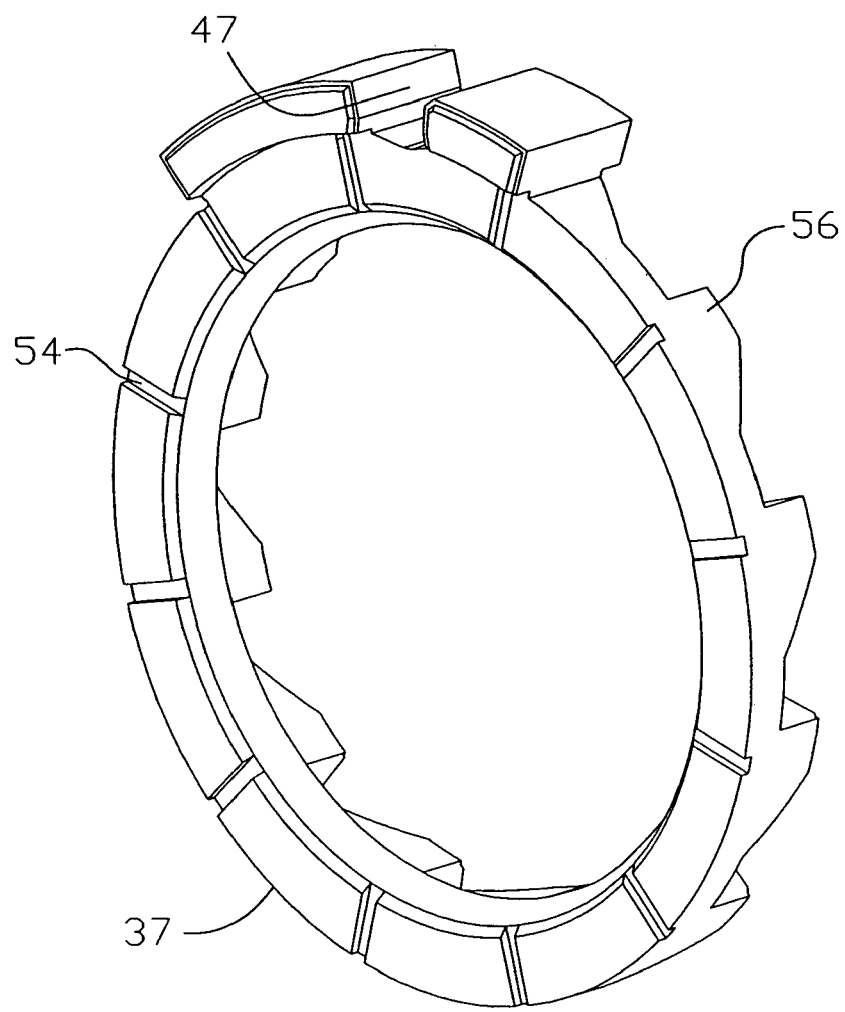
FIG. 10 is a perspective view of the rotating cam of the first embodiment of the present invention.

As shown most clearly in FIG. 10, rotating cam 37 has a plurality of teeth 56 corresponding to ramps 51 on stationary cam 36. When actuating cam 41 is in its first or disengaged position as shown in FIGS. 4, 5 and 9 stationary cam 36 and rotating cam 37 are in close mating relationship. Rotation of actuator handle 46 transfers this rotation through shaft 44 to actuating cam 41, which is mounted in slot 47 located on rotating cam 37. As will be understood, movement of actuating cam 41 to its second or engaged position as shown in FIGS. 6 and 7 causes teeth 56 of rotating cam 37 to travel up ramp 51 to engage flats 53, thus moving rotating cam 37 in an axial direction away from stationary cam 36. This axial motion is transmitted through thrust bearing 29E to load plate 35. Load plate 35 has two arms 45 integrally formed therewith which directly contact the flat surface 30 of engagement dogs 42, to force dogs 42 to similarly move in an axial direction, placing gear teeth 32 into contact with axle bevel gear 31A, locking the differential.

This construction keeps the unit in the locked position; the contact with flat 53 prevents teeth 56 from moving back down ramp 51, thus moving rotating cam 37 towards stationary cam 36, taking the unit out of engagement, unless and until the actuating cam 41 is moved by the user back to the appropriate position. When actuating cam 41 is fully actuated, the portion that mates with slot 47 is past the center of rotation of shaft 44 with respect to force from motion of rotating cam 37, thus forming an over-center design, as can be best seen in FIG. 6. Thus in the actuated or engaged position, any force from rotating cam 37 will be directed to keeping actuating cam 41 in the engaged position, thereby preventing a disengaging force from being transmitted back through the attached vehicle linkage (not shown). Oil grooves 54 are formed in the surface of rotating cam 37 that engages thrust washer 29E for the purpose of improving lubrication of these parts.

Figure 14:
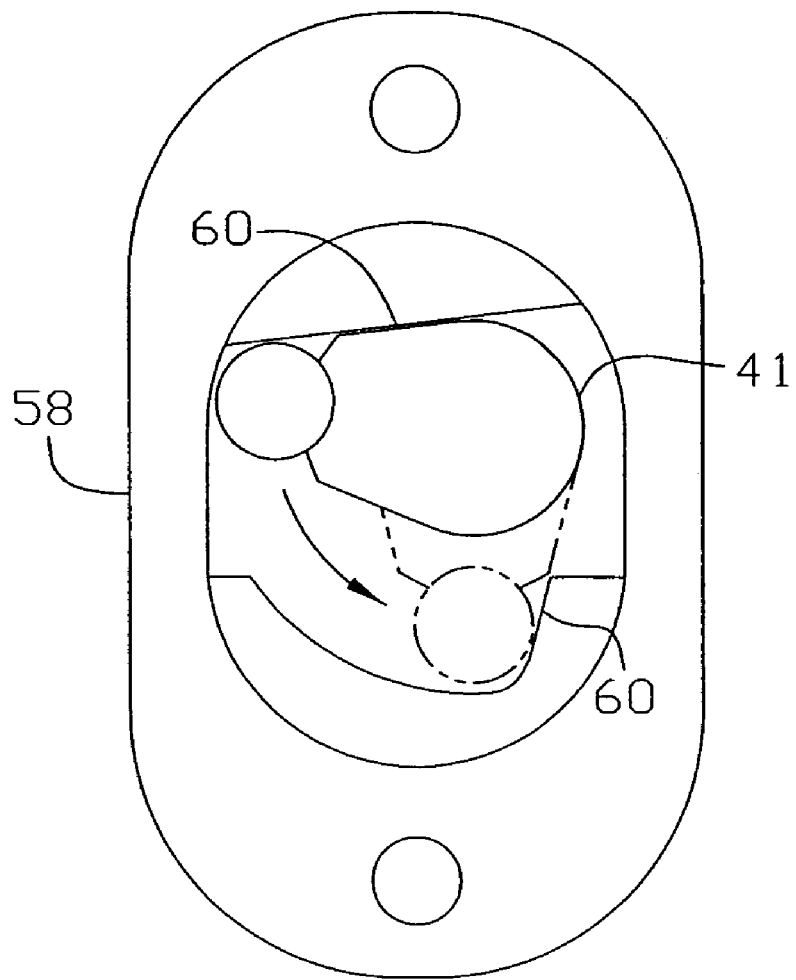
FIG. 14 is a bottom plan view of the sleeve and actuating cam of the first embodiment of the present invention.

Actuating handle 46 is mounted on shaft 44 by means of splines and retaining ring 52; any other known method could also be used. A sleeve 58 may be used between actuating cam 41 and handle 46 to provide stops 60, as shown in, e.g., FIGS. 1, 8 and 14. Screws 59 or similar methods could be used to secure sleeve 58 to housing 12. Sleeve 58 could also be integrally formed as part of housing 12. FIG. 14 shows a view from the bottom of sleeve 58, showing stops 60 formed therein to limit rotary movement of cam 41. Sleeve 58 is preferably formed of powdered metal, but can also be formed of zinc, plastic or another material suitable for the actuation forces. Cam 41 is shown in the disengaged position in solid lines and the engaged position in dashed lines in FIG. 14.

The specific shape and construction of load plate 35 and arms 45 is not critical, and the function of arms 45 could be performed by different structure within the scope of this invention. For example, arms 45 of load plate 35 could instead be formed as part of engagement dogs 42, which may eliminate the need for load plate 35.

Figure 20:
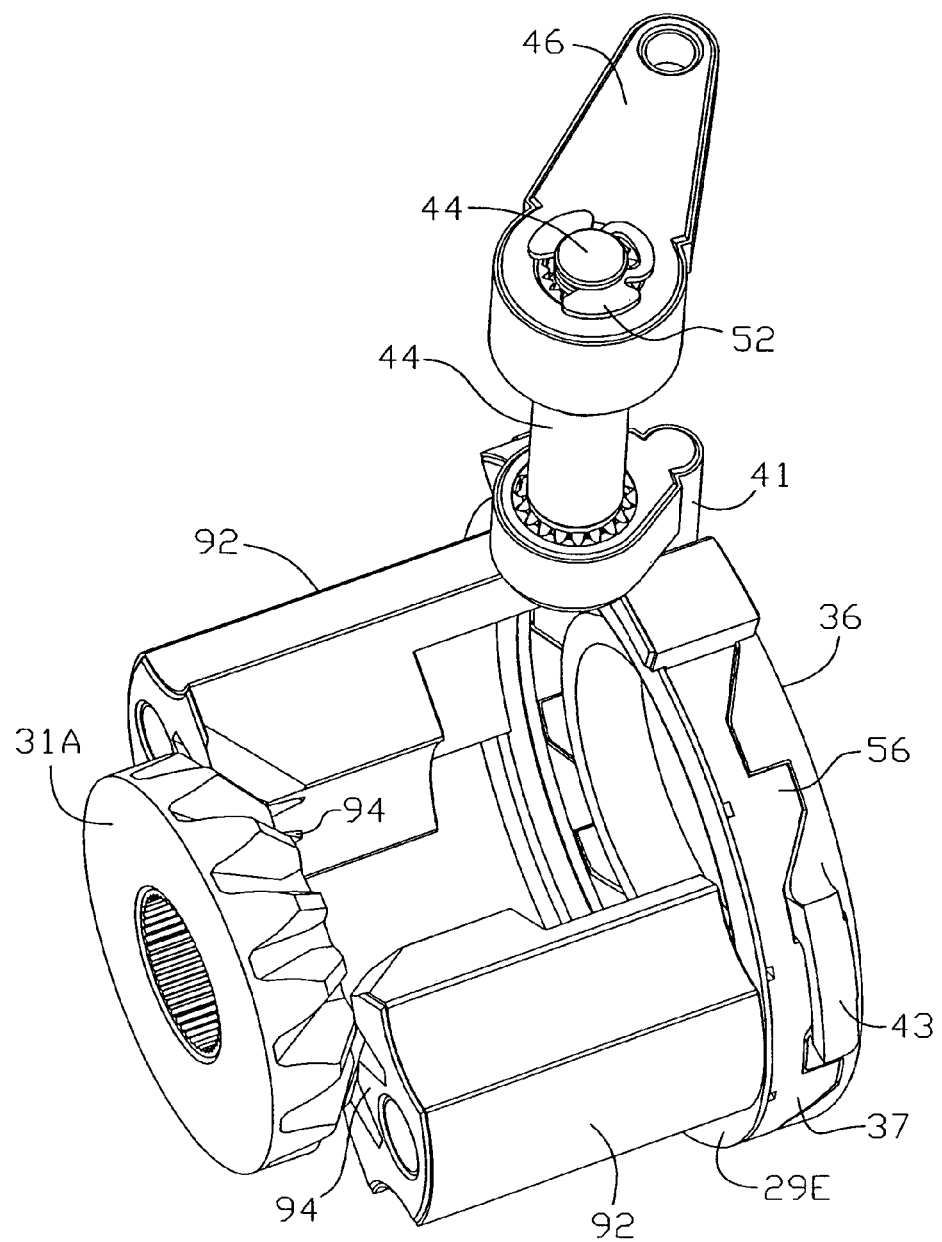
FIG. 20 is a detail perspective view of the cams and actuating mechanism of a fourth embodiment of this invention.

FIG. 20 shows an alternative embodiment, where like numerals indicate identical structure as discussed above. In this embodiment, engagement mechanism 92 performs the function of both dogs 42 and load plate 35 in the first embodiment described above. Axial movement of rotating cam 37 transfers force through bearing 29E directly to engagement mechanism 92, moving engagement mechanism 92 toward axle bevel gear 31A, placing gear teeth 94 into engagement therewith and creating differential locking as described above. This alternative embodiment does not require the annular ring design of load plate 35, although engagement mechanism 92 could incorporate such an annular ring at the end adjacent to rotating cam 37. Elimination of the annular ring feature facilitates manufacture of the component through a net shape forming process.

FIGS. 16–19 show an alternative embodiment in which like numerals indicate identical structure as described above. The actuating mechanism in this embodiment comprises actuating handle 71 and link sleeve 75 mounted on splined shaft 73 of pivoting link 77. A retaining ring (not shown) or similar device could be used to maintain the units on shaft 73. Splined shaft 73 could also be a separate component and pressed into or otherwise attached to pivoting link 77. Pivoting link 77 is engaged to translating link 79, which is itself engaged to an extension 68, which may be integrally formed rotating cam 67. Stationary cam 66 engages rotating cam 67 in the manner described above.

Figure 21:
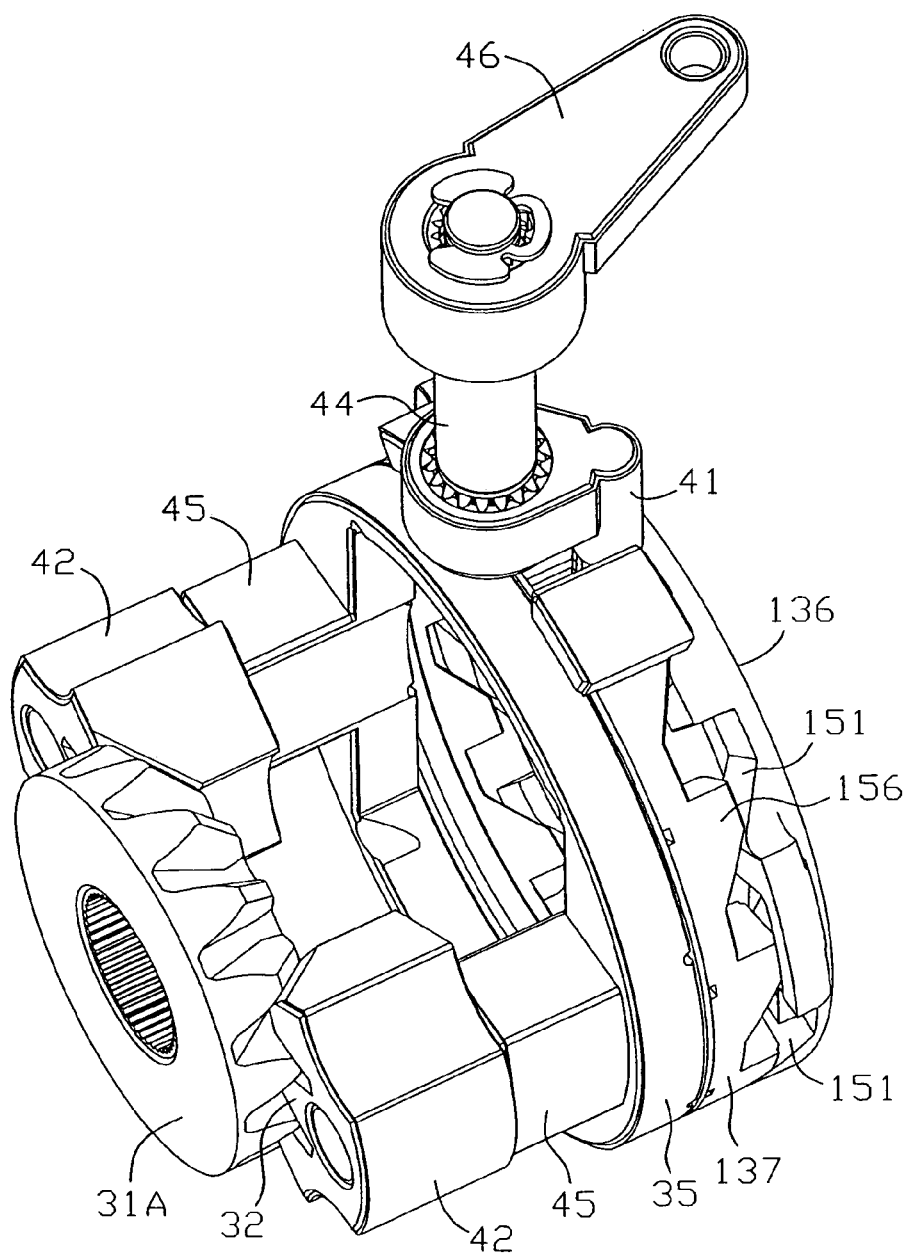
FIG. 21 is a detail perspective view similar to FIGS. 5 and 7 and showing a fifth alternative embodiment of this invention.

A further alternative embodiment is shown in FIG. 21, where the unit is biased towards a return to the unlocked position; i.e., it will stay in locked mode only so long as a force is applied to actuating cam 41 or until the force keeping rotating cam 137 in place is overcome by the separating force against gear teeth 32 axially transmitted through load plate 35. To accomplish this feature, the geometry of the cams 136 and 137, including cam teeth 156 and ramps 151, is modified to enable actuation of the unit while cam teeth 156 remain on ramps 151. In this manner a differential lock with overload protection may be implemented, wherein the force on actuator handle 46 establishes the disengagement or overload force. Rotation of actuating cam 41 could be limited by either stop 60 within sleeve 58 or other external stops (not shown) in order to maintain contact between rotating cam 137 and stationary cam 136 on teeth 156 and ramps 151, respectively. A similar feature could be incorporated into the embodiments shown in FIGS. 5 and 7 without modifying the cam geometry by changing the spatial relationships of gear dog 42 and axle bevel gear 31A. Such repositioning would decrease the clearance between gear dog 42 and axle bevel gear 31A. Therefore, the design of the ramps 51 in the embodiments shown in FIGS. 5 and 7 would need to be such to provide the axial movement of gear dogs 42 to allow full engagement and complete disengagement of dog teeth 32 and axle bevel gear 31A for the specific range of embodiments selected.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A vehicle driving apparatus comprising:
    a pair of output axles mounted in an axle housing;
    a differential housing mounted in and rotatable with respect to the axle housing;
    an engagement mechanism for engaging at least one of the output axles to the differential housing to restrict rotation of the at least one axle with respect thereto, the engagement mechanism contacting and rotating with the differential housing and having a first position where movement of the at least one axle is not restricted and a second position where movement of the at least one axle is restricted with respect to the differential housing; and
    a cam mechanism mounted in the axle housing and comprising a first stationary cam fixed with respect to the axle housing, a second cam which is rotatable with respect to the first cam and an actuation member to cause rotation of the second cam with respect to the first cam, whereby rotation of the second cam causes the engagement mechanism to move from the first position to the second position.

2. A vehicle driving apparatus as set forth in claim 1, further comprising a pair of axle bevel gears, each axle bevel gear mounted on one end of one of the output axles.

3. A vehicle driving apparatus as set forth in claim 2, wherein the engagement mechanism comprises a pair of gear dogs slidable with respect to the differential housing along the longitudinal axis of the pair of output axles, and the gear dogs engage the teeth of one of the axle bevel gears when the engagement mechanism is in the second position.

4. A vehicle driving apparatus as set forth in claim 3, wherein the engagement mechanism further comprises a load plate.

5. A vehicle driving apparatus as set forth in claim 1, wherein the actuation member extends out of the axle housing and is generally perpendicular to the longitudinal axis of the output axles.

6. A vehicle driving apparatus comprising:
    a pair of output axles mounted in an axle housing, each output axle having an axle bevel gear mounted on one end thereof;
    a differential housing mounted in and rotatable with respect to the axle housing;
    at least one gear dog located between the two bevel gears and engaged to the differential housing and slidable in a direction parallel to the longitudinal axis of the axles between a first position where the at least one gear dog is not in contact with either of the two bevel gears, and a second position where the at least one gear dog contacts the teeth of one of the bevel gears to rotationally lock said one of the bevel gears to the differential housing; and
    a cam mechanism mounted in the axle housing comprising a first stationary cam fixed with respect to the axle housing, a second cam which is rotatable with respect to the first stationary cam and an actuation member to cause rotation of the second cam with respect to the first cam, whereby rotation of the second cam causes the gear dog to slide to the second position.

7. A vehicle driving apparatus as set forth in claim 6, said at least one gear dog comprising a pair of gear dogs located between the two bevel gears, wherein both gear dogs contact the gear teeth of only one of the bevel gears to rotationally lock said one of the bevel gears to the differential housing when the gear dogs are in the second position.

8. A vehicle driving apparatus comprising:
a pair of output axles mounted in an axle housing;
a pair of axle bevel gears, each mounted on one of the output axles;
a differential housing mounted in the axle housing and rotatable with respect to the axle housing;
at least two differential gears mounted in the differential housing and rotatable with respect to the axle bevel gears;
at least one gear dog in contact with the differential housing and slidable with respect thereto; and
an actuating mechanism comprising a load plate located adjacent to a first of the pair of axle bevel gears and a cam mechanism mounted in the axle housing and engaged to the load plate, whereby actuation of the actuating mechanism causes the at least one gear dog to engage only the second of the pair of axle bevel gears.

9. A vehicle driving apparatus as set forth in claim 8, said at least one gear dog comprising a pair of gear dogs in contact with the differential housing, wherein actuation of the actuating mechanism causes both gear dogs to engage the gear teeth of only said second bevel gear.

10. A vehicle driving apparatus as set forth in claim 9, wherein the load plate is in the shape of an annular ring having two arms formed on one side thereof, and each arm engages one of the gear dogs.

11. A vehicle driving apparatus comprising:
a pair of output axles mounted in an axle housing, each output axle having an axle bevel gear mounted on one end thereof;
a differential housing mounted in the axle housing and rotatable with respect to the axle housing;
at least two differential gears mounted in the differential housing and rotatable with respect to the axle bevel gears;
at least one gear dog in contact with the differential housing;
a locking mechanism located adjacent one of the axle bevel gears, the locking mechanism causing the at least one gear dog to engage the other axle bevel gear so that the other axle bevel gear rotates with the differential housing when the locking mechanism is actuated; and
a cam mechanism to actuate the locking mechanism, wherein the cam mechanism comprises a first stationary cam fixed with respect to the axle housing, a second cam which is rotatable with respect to the first cam and movable along the axis of the output axles, and an actuation member which is rotatable to cause rotation of the second cam with respect to the first cam.

12. A vehicle driving apparatus comprising:
a pair of output axles mounted in an axle housing, each output axle having an axle bevel gear mounted on one end thereof, each axle bevel gear having a set of gear teeth formed thereon, wherein the gear teeth of the two axle bevel gears are facing one another;
a differential housing mounted in the axle housing and rotatable with respect to the axle housing;
at least two differential gears mounted in the differential housing and engaged to the gear teeth of both axle bevel gears; and
at least one gear dog engaged to the differential housing and movable between a first position where it is not in contact with either of the two axle bevel gears and a second position where it contacts the gear teeth of only one of the axle bevel gears to rotationally lock said one of the axle bevel gears to the differential housing.

13. A vehicle driving apparatus comprising:
a pair of output axles mounted in an axle housing, each output axle having an axle bevel gear mounted on one end thereof;
a differential housing mounted in the axle housing and rotatable with respect to the axle housing;
a cross shaft mounted in the differential housing;
at least two differential gears mounted on the cross shaft and engaged to the teeth of the axle bevel gears; and
at least one gear dog mounted separate from the cross shaft and engaged to the differential housing, the at least one gear dog having a first position where it is not in contact with either axle bevel gear and a second position where it is engaged to the teeth of one of the axle bevel gears, whereby the teeth of said one axle bevel gear are simultaneously engaged to the differential gears and the at least one gear dog when the at least one gear dog is in the second position.

14. A vehicle driving apparatus as set forth in claim 13, wherein the cross shaft is solid.

15. A vehicle driving apparatus as set forth in claim 13, said at least one gear dog comprising a pair of gear dogs mounted separate from the cross shaft and engaged to the differential housing.

16. A vehicle driving apparatus comprising:
a pair of output axles mounted in an axle housing, each output axle having an axle bevel gear mounted on one end thereof;
a differential housing mounted in the axle housing and rotatable with respect to the axle housing;
a cross shaft mounted in the differential housing and at least two differential gears mounted on the cross shaft and engaged to the axle bevel gears;
an engagement mechanism for restricting rotation of one of the output axles with respect to the differential housing; and
a cam mechanism for moving the engagement mechanism into engagement with one of the axle bevel gears, wherein the engagement mechanism and cam mechanism are located on opposite sides of the center line of the cross shaft.

17. A vehicle driving apparatus as set forth in claim 16, wherein actuation of the cam mechanism moves the cam mechanism toward the center line of the cross shaft and the engagement mechanism away from the center line of the cross shaft.

* * * * *